No. 732,423. PATENTED JUNE 30, 1903.
L. LOUIS.
LUNCH BOX.
APPLICATION FILED APR. 3, 1900.
NO MODEL.
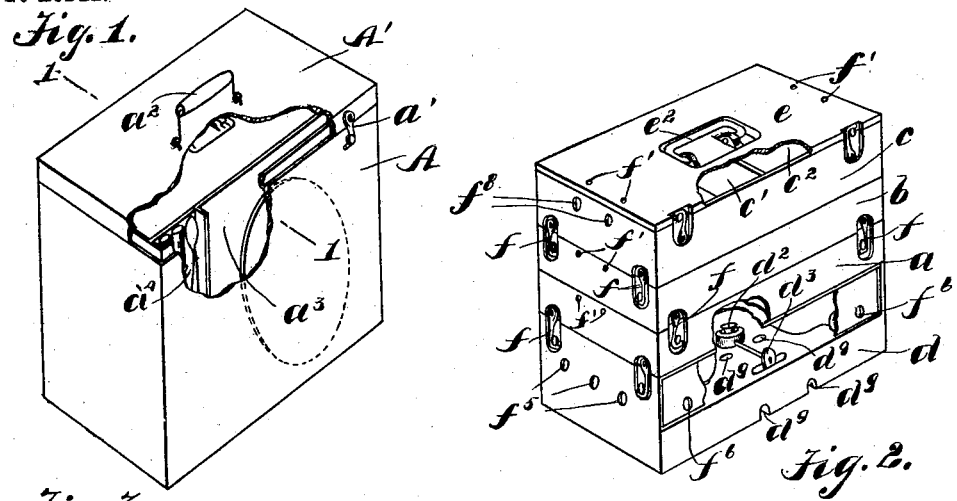
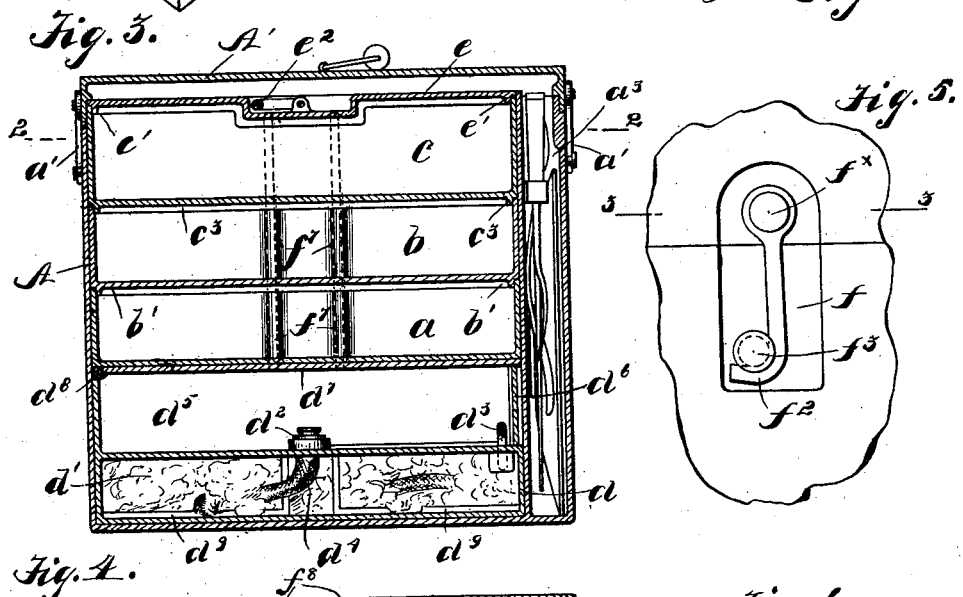
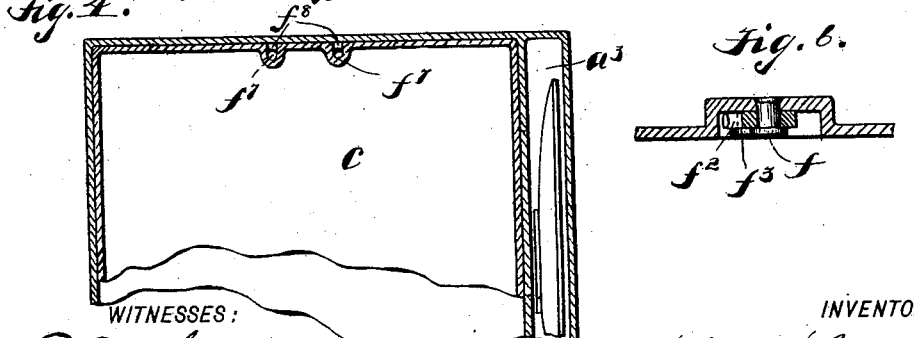
WITNESSES:
P. McComb
C. E. Clarke
INVENTOR
Louis Louis
BY
S. S. Sugar
ATTORNEY No. 732,423.

Patented June 30, 1903.

UNITED STATES PATENT OFFICE.

LOUI LOUIS, OF NEW YORK, N. Y.

LUNCH-BOX.

SPECIFICATION forming part of Letters Patent No. 732,423, dated June 30, 1903.

Application filed April 3, 1900. Serial No. 11,296. (No model.)

*To all whom it may concern:*

Be it known that I, LOUI LOUIS, a citizen of the United States, and a resident of 166 East One Hundred and Thirteenth street, New York city, county of New York, and State of New York, have invented certain new and useful Improvements in Lunch-Boxes, of which the following is a specification, reference being had to the accompanying drawings, forming a part thereof, in which similar letters of reference indicate corresponding parts.

My invention relates to an improved form of lunch-can, comprising receptacles having one or more compartments for containing victuals, and a heating device adapted to heat said victuals contained in the compartments, all suitably connected and adapted to be contained in an outer casing or covering, which is provided with a compartment for carrying a plate, knife, fork, and spoon.

The nature of my invention will be best understood by the description set forth in the annexed specification, reference being had to the accompanying drawings, in which similar letters refer to similar parts, and in which—

Figure 1 is a general perspective view of my improved lunch-can, showing the outer casing partly broken away. Fig. 2 is a perspective view showing the receptacles and heating apparatus removed from the outer casing and shows parts broken away to better illustrate the interior. Fig. 3 is a section through the lunch-can on the line 1 1 shown on Fig. 1. Fig. 4 is a section on the line 2 2 of Fig. 3 and shows a partial plan view on that line. Figs. 5 and 6 are detail views of a hook used in connecting the parts.

In the practice of my invention I provide the receptacles $a$, $b$, and $c$ and heating apparatus $d$. The heating apparatus $d$ is formed with a compartment $d'$, adapted to contain any absorbent material, which may be saturated with alcohol or other inflammable material, and is provided with a burner $d^2$, having a regulating-screw $d^3$, which is adapted to raise and lower the wick $d^4$, thereby regulating the size of the flame in the compartment $d^5$ of the heating device $d$. The front portion of the compartment $d^5$ is closed by means of the piece $d^6$, which slides in a groove formed at the front end of the said compartment, and a cover $d^7$ is hinged to the heating device at $d^8$ and is adapted to close over the compartment $d^5$. The receptacle $a$ rests directly upon the heating device $d$ over the cover $d^7$, and is adapted to contain a liquid food. The receptacle $b$ rests directly upon the receptacle $a$ and acts as a cover for same. The under side of the receptacle $b$ is provided with a flange $b'$, which holds the same upon the receptacle $a$. The receptacle $c$, which is made up of two compartments $c'$ and $c^2$, is adapted to rest upon the receptacle $b$ and act as a cover for same and is also provided with the flanges $c^3$. A cover $e$ is provided with the flanges $e'$ and is adapted to be placed over the receptacle $c$ and has a handle $e^2$ suitably fastened to it.

The different receptacles and heating device are all detachable and are held together, when placed one above the other, by the hooks $f$, one end of which is securely fastened to the receptacle above, as at $f^\times$, and the lower or hooked end $f^2$ engages a pin $f^3$, fastened to the receptacle below it. The said hooks $f$ and the aforesaid handle $e^2$ are fastened in depressed pockets, so that they do not project beyond the surface of the receptacles.

To secure proper ventilation and draft for the flame at the burner $d^2$, I provide the passages $d^9$, which admit air into the compartment $d^5$. I further provide openings $f^5$, formed in the side of the heating device $d$, and openings $f^6$, formed in the sliding front of same, all of which admit air into the compartment $d^5$. Upon the receptacles $a$, $b$, and $c$ I provide the passages $f^7$, which lead from the compartment $d^5$ to the outer atmosphere through the ports $f^8$.

When the parts are properly fastened together, they may be lifted by the handle $e^2$ and placed within the outer casing A, which is provided with a cover A', securely fastened to the casing A by means of the attaching-hooks $a'$. The said cover is in turn provided with a handle $a^2$. Formed inside of the casing A are the compartments $a^3$ and $a^4$, the compartment $a^3$ being adapted to contain a plate and the compartment $a^4$ being adapted to contain a knife, fork, and spoon.

The compartment $d^5$ of the heating device $d$ may be employed to contain a bottle containing any drinking fluid, a cup, pepper and salt receptacles, or other portable accessories.

In heating the victuals contained in the receptacles the said receptacles are placed one at the time upon the cover $d^7$ and each in turn are heated, or they may be all placed above the heating device, as shown in Fig. 2, and the flame applied directly beneath the receptacle $a$, in which case the steam generated in the compartments would have egress through openings $f'$, which may be suitably closed when the heating device is not in use.

It is obvious that I may employ a similar construction involving any number of receptacles and am not limited to just the three receptacles shown in the drawings.

The device as illustrated is preferably made of sheet metal.

Having thus described my invention, what I claim as new, and desire to secure by Letters Patent, is—

1. In a lunch-can, detachable receptacles having compartments formed therein and suitable means for connecting one above the other, a heating device attached to the lower compartment, tubular casings formed within said receptacles and adapted, when the said receptacles are arranged one above the other, to form a continuous passage leading from the heating-chamber to the outer atmosphere, and an outer casing or carrying-box provided with compartments for holding eating utensils and provided with a suitable carrying-handle, substantially as described.

2. In a lunch-can, receptacles having compartments formed therein, suitable means for connecting one above the other and a heating device attached to the lower compartment beneath same, in combination with tubular passages formed within the said receptacles and adapted, when the receptacles are arranged one above the other, to form a continuous passage leading from the heating-chamber to the outer atmosphere, substantially as described.

In testimony that I claim the foregoing as my invention I have signed my name, in presence of two witnesses, this 30th day of March, 1900.

LOUI LOUIS.

Witnesses:
B. McComb,
S. S. Sugar.